United States Patent [19]

McCullough, Jr.

[11] Patent Number: 4,508,872

[45] Date of Patent: Apr. 2, 1985

[54] HIGH TOUGHNESS PROPYLENE POLYMER COMPOSITIONS

[75] Inventor: J. Douglas McCullough, Jr., Houston, Tex.

[73] Assignee: Shell Oil Company, Houston, Tex.

[21] Appl. No.: 582,417

[22] Filed: Feb. 22, 1984

[51] Int. Cl.³ .................. C08L 53/00; C08L 23/04; C08L 23/26

[52] U.S. Cl. .................. 525/88; 525/240; 525/192; 525/194

[58] Field of Search .................. 525/88, 240

[56] References Cited

U.S. PATENT DOCUMENTS

| | | | |
|---|---|---|---|
| 3,200,173 | 8/1965 | Schilling | 260/878 |
| 3,207,739 | 9/1965 | Wales | 260/93.7 |
| 3,268,499 | 8/1966 | Wales | 260/93.7 |
| 3,318,976 | 5/1967 | Short | 260/878 |
| 3,514,501 | 5/1970 | Liebson et al. | 260/878 |
| 3,937,758 | 2/1976 | Castagna | 525/88 |
| 4,140,732 | 2/1979 | Schnetger et al. | 525/88 |
| 4,359,553 | 11/1982 | Edwards | 525/240 |
| 4,375,531 | 3/1983 | Ross | 525/93 |

*Primary Examiner*—Carman J. Seccuro
*Attorney, Agent, or Firm*—Dean F. Vance

[57] ABSTRACT

Blends of sequentially polymerized ethylene-propylene copolymers, high density ethylene homopolymers, and linear low density polyethylene subjected to peroxide-contacting possess extremely good impact resistance along with high melt flows without excessive loss of stiffness.

28 Claims, No Drawings

HIGH TOUGHNESS PROPYLENE POLYMER COMPOSITIONS

BACKGROUND OF THE INVENTION

1. Field of the Invention

This invention relates to modified propylene polymer compositions of improved flow and impact resistance. More particularly, the invention relates to blends of sequentially polymerized propylene copolymers with high density ethylene homopolymers and linear low density ethylene copolymers and the visbreaking of these blends to higher flow products.

2. Description of the Prior Art

Polypropylene is a well known commercial polymer, used for a variety of products such as packaging films and extruded and molded shapes. It is produced by polymerization of propylene over transition metal coordination catalysts, specifically titanium halide containing catalysts. Commercial polypropylene is deficient in resistance to impact at low temperatures, i.e., 0° C. and below. It is known that incorporation of some elastomers, particularly elastomeric copolymers of ethylene and propylene, improves the low temperature impact resistance of polypropylene.

One method of incorporating elastomeric ethylene-propylene copolymers into polypropylene is by sequential polymerization of propylene and ethylene-propylene mixtures. In typical processes of this kind, propylene homopolymer is formed in one stage and the copolymer is formed in a separate stage, in the presence of the homopolymer and of the original catalyst. Mutiple stage processes of this type are also known. Products of such sequential polymerization processes are sometimes referred to as "block copolymers" but it is now understood that such products may rather be intimate blends of polypropylene and ethylene-propylene elastomer. The products of such sequential polymerization of propylene and ethylene-propylene mixtures, are, referred to herein as sequentially polymerized propylene-ethylene copolymers or as in-situ produced copolymers. To maintain separate terminology for the total sequentially polymerized copolymer composition and the elastomeric copolymer fraction thereof, the total copolymer composition is referred to as impact-improved propylene-ethylene copolymer which has a specified content of an elastomeric ethylene-propylene copolymer fraction and which is the product of sequential polymerization of propylene and a propylene-ethylene mixture.

Methods for producing impact-improved, sequentially polymerized propylene-ethylene copolymers are well known. See, for example, "*Toughened Plastics*" by C. B. Bucknall, Applied Science Publishers Ltd. 1977, pp. 87-90, and T. G. Heggs in *Block Copolymers*, D. C. Allport and W. H. James (eds), Applied Science Publishers Ltd. 1973, chapter 4. Representative U.S. patents describing such methods are: U.S. Pat. Nos. 3,200,173-Schilling; 3,318,976-Short; and 3,514,501-Leibson et al.

These impact-improved, sequentially polymerized propylene-ethylene copolymers are sometimes blended with other polymers to improve certain properties. In some cases these impact copolymers are blended with polymers such as high density polyethylene (HDPE) or low density polyethylene (LDPE). See, e.g., the patents cited in the Description of the Prior Art in copending patent application, Ser. No. 444,754, filed Nov. 26, 1982, now U.S. Pat. No. 4,459,385 having a common assignee, and U.S. Pat. No. 4,375,531. The blends covered in the above-mentioned patent application are blends of impact propylene copolymers and linear-low density ethylene copolymers. Such blends have good impact resistance without excessive loss of stiffness. While such blends are useful in applications requiring high impact resistance, there are applications that require improved flow performance and fabricating performance. It is known by those familiar with the manufacture of propylene polymers that production of high flow polymers in the reactor may be difficult due to chain transfer limitations, and the products thereof may suffer embrittlement. Visbreaking in extrusion equipment provides an alternative route to high flow without these adverse effects. Accordingly, we have now discovered a new composition that has such improved flow performance as obtained through visbreaking with peroxide, along with retention of substantial impact resistance.

SUMMARY OF THE INVENTION

The present invention deals with compositions having not only excellent flow characteristics, but also possessing excellent impact strengths (especially at low temperature) along with ease of manufacture. Specifically, the present invention deals with compositions having melt flows between about 5 and about 50 dg/min (ASTM D1238-Condition L), and high impact values, said compositions being obtained by peroxide-contacting the blend of 50-90% by weight of an impact-modified propylene polymer, 3 to 45% by weight of a high density ethylene homopolymer and 3 to 45% by weight of a linear low density ethylene copolymer, wherein:

(a) said impact-modified propylene polymer has a melt flow (ASTM D1238-Condition L) of about 0.5-15 dg/min and an elastomeric propylene-ethylene copolymer content of 5-50% by weight, the copolymer fraction having an ethylene content of 30-95% by weight, which copolymer fraction is the product of an essentially random polymerization of a propylene-ethylene mixture over a titanium halide-containing coordination catalyst;

(b) said high density ethylene homopolymer has a density in the range from 0.941 to 0.965 g/cc and a melt index (ASTM D1238 Cond. E) in the range from 0 to 20 dg/min;

(c) said linear low density ethylene copolymer is the product of random polymerization of ethylene with up to 15 mole percent of at least one $C_3$-$C_8$ alpha olefin monomer over a transition metal-based coordination catalyst and which has a density in the range from 0.912 and 0.935 g/cc and a melt index (ASTM D-1238-Condition E) not exceeding 16; and (d) the weight ratio of high density ethylene homopolymer to linear low density ethylene copolymer is between 80:20 and 20:80.

In a preferred embodiment, the impact-modified propylene copolymer is peroxide-contacted (visbroken) separately, and the high density ethylene homopolymer and linear low density ethylene copolymer are melt blended with the visbroken propylene copolymer. Accordingly, the present invention also contemplates compositions obtained by first peroxide-contacting an impact-modified propylene polymer and then mixing the resulting visbroken propylene polymer with a linear low density ethylene copolymer and a high density ethylene homopolymer, wherein:
(a) said impact-modified propylene polymer has a melt flow of (ASTM D1238-Condition L) of about 0.5–15 dg/min and an elastomeric propylene-ethylene coolymer content of 5–50% by weight, the copolymer fraction having an ethylene content of 30–95% by weight, which copolymer fraction is the product of an essentially random polymerization of a propylene-ethylene mixture over a titanium halide-containing coordination catalyst;
(b) said high density ethylene homopolymer has a density in the range from 0.941 to 0.965 grams per cubic centimeter and a melt index (ASTM D1238-Condition E) in the range from 0 to 20 dg/min;
(c) said linear low density ethylene copolymer is the product of random polymerization of ethylene with up to 15 mole percent of at least one $C_3$–$C_8$ alpha olefin monomer over a transition metal-based coordination catalyst and which has a density in the range from 0.912 to 0.935 and a melt index (ASTM D1238-Condition E) not exceeding 16; and
(d) said composition comprises 50–90% by weight of said impact-modified propylene polymer, 3–45% by weight of said high density ethylene homopolymer, 3–45% by weight of said linear low density ethylene copolymer, wherein the weight ratio of said high density ethylene homopolymer to said linear low density ethylene copolymer is between 80:20 and 20:80.

In another embodiment, said LLDPE and HDPE to be used in combination for impact modification may be pre-combined by melt mixing, physical blending, or through slurry mixing within a process train so designed as to make both types of polyethylene independently. Also, the HDPE and LLDPE may be separately added to the impact-modified propylene copolymer as one chooses in melt compounding equipment, including that used for final product fabrication.

As shown in the examples which follow, compositions according to this invention have unexpectedly high notched impact strength. The significance of improved notched impact strength lies in expectations for improved toughness for a variety of molded parts having sharp radii, grained or grooved/ribbed surfaces, etc. Hence, a notch resistant PP should open doors to greater part design flexibility.

DESCRIPTION OF THE INVENTION

This invention is directed to modified polypropylene polymer molding compositions which provide good low temperature impact resistance and high flow characteristics at acceptable levels of stiffness in extruded or injection molded articles.

Before discussing the invention further, reference is made to the methods of measuring impact resistance and stiffness, employed in this description.

Impact resistance may be measured by a variety of methods. A frequently employed method is the notched Izod impact test (ASTM D-256). Until now, the generally low notched impact strength of even impact-improved polypropylene has been a matter of record, and the industry has designed parts such that sharp radii and grained or grooved surfaces are generally minimized. Hence, falling weight impact has historically been the primary indicator of toughness, and it remains a key discriminator between materials. The falling weight method employed in this description is the Gardner impact test. In that method an impacting device having a $\frac{5}{8}$ inch diameter rounded tip rests on the injection molded circular sample disk (125 mil thick) which is supported at the rim. The sample disk is one of a series from the same composition, which has, in this case, been cooled to $-30°$ C. A weight is dropped on the impacting device from a variable measured height. The sample disk is replaced after each drop; the height from which the weight is dropped is varied until the breaking point of the series of disks is defined. The impact strength, reported in units of Joules, ft-lbs or in-lbs, is the product of the mass of the dropped weight and the height of drop at which 50% of the disks resist breaking.

The stiffness of test strips molded from various compositions is reported as the 1% secant flexural modulus, determined in a standard test (ASTM D790) performed at 0.05 inch per minute. Flexural modulus may be reported in units of megapascals (MPa) or pounds per square inch (psi).

As described in the prior art, it is known that the low temperature impact resistance of propylene homopolymers is deficient for uses where articles may be exposed to temperatures of 0° C. or below. Commercially, low temperature impact resistance of propylene polymers is improved by blending polypropylene homopolymers with certain elastomers, particularly ethylene-propylene copolymers, or with mixtures of such elastomers with high density polyethylene, or by introducing ethylene-propylene elastomer into the propylene polymer during polymerization by a sequential polymerization process. As a general rule, impact resistance increases with increasing amounts of elastomer in the total composition. One of the adverse effects of the addition of ethylene-propylene elastomer is the concomitant reduction in stiffness of the product, stiffness being one of the attractive properties of propylene homopolymer. The balance of impact and stiffness is critical in the judging of the performance of polypropylene molding and extrusion compositions. Even though the admixture of polyethylene to improve the impact resistance of polypropylene compositions, including sequentially polymerized propylene-ethylene copolymers, has been disclosed in patents issued as early as 1966, such compositions have apparently found no practical use in commerce.

Impact improved propylene polymers are often referred to in the trade as "medium impact", "high impact", and "extra/super high impact" polypropylene. Typical ranges of properties for commercial products of this type are as follows:

| Property | Medium Impact | High Impact | Extra/Super High Impact |
|---|---|---|---|
| 1% Secant flexural modulus, MPa | 1000–1430 | 800–1200 | 700–1100 |
| Impact Strength (125 mil disks) Gardner at $-30°$ C., J | 1–15 | 15–30 | 30–45 |
| Izod, notched, at 23° C., J/m | 60–100 | 100–300 | 300–No break |

Sequentially polymerized propylene-ethylene copolymers which are improved according to this invention are materials of commerce. They may be produced by sequential polymerization of propylene and propylene-ethylene mixtures by contact with Ziegler-Natta coordination catalysts, specifically those in which the transition metal is titanium, by well known methods. Such methods are described, for example, in the literature cited above. The catalysts generally employed in commercial processes are combinations of a violet TiCl$_3$ composition with an aluminum alkyl compound such as diethyl aluminum chloride. Newer types of coordination catalysts, such as compositions of TiCl$_4$ supported on magnesium chloride and modified with an electron donor, which are used with an aluminum trialkyl cocatalyst and a selectivity control agent such as an aromatic ester, may also be used to produce the sequentially polymerized copolymers.

The sequentially polymerized propylene-ethylene copolymers should have compositions and properties in the following ranges:

|  | Suitable | Preferred | Best |
| --- | --- | --- | --- |
| Homopolymer, % Weight | 50-95 | 80-95 | 85-92 |
| Ethylene-Propylene Copolymer, % Weight | 50-5 | 20-5 | 15-8 |
| Ethylene Content of Copolymer Fraction, % Weight | 30-95 | 40-70 | 45-65 |
| Melt Flow, dg/min | .5-15 | .5-15 | .5-15 |

"High density polyethylenes" (HDPE), typically having densities in the range of 0.941 to 0.965 g/cc, may be produced by means of transition metal catalysts of the Ziegler-Natta type or Phillips Petroleum Company's chromia type in processes operating at relatively low pressures. They may also be referred to as low pressure polyethylenes. HDPEs are characterized by linearity and crystallinity. Minor amounts of typically butene-1 monomer may be copolymerized with the ethylene in order to improve stress crack resistance.

Linear low-density polyethylenes which may be blended with said propylene-ethylene copolymers and high density ethylene homopolymers according to this invention are random copolymers of ethylene with 1-15 mole percent, and typically with no more than 10%, of higher alpha-olefin co-monomer, e.g., propylene, n-butene-1, n-hexene-1, n-octene-1 or 4-methylpentene-1, produced over transition metal coordination catalysts. As shown in the examples which follow, a much preferred comonomer is 1-butene. Such polymers are commercially available. Commercial products generally are produced in liquid phase or vapor phase polymerization processes. LLDPE polymers suitable for use in this invention should have properties in the following ranges:

|  | Suitable | Preferred | Best |
| --- | --- | --- | --- |
| Melt Index, dg/min (ASTM D1238 Cond. E) | 1-16 | 1-12 | 1-7 |
| Density, g/cc | 0.912-0.935 | 0.917-0.935 | 0.917-0.925 |
| Tensile Properties (ASTM D638) | | | |
| Yield, MPa | 8-17 | 8-15 | 8-12 |
| Break, MPa | 8-25 | 10-25 | 15-25 |
| Elongation at Break, % | 100-1200 | 400-1200 | 600-1200 |
| Brittleness Temp., °C. | < −80 | < −80 | < −80 |

The blended compositions of this invention contain sequentially polymerized propylene-ethylene copolymer, high density ethylene homopolymer (HDPE) and LLDPE in the following proportions:

|  | Suitable | Preferred | Best |
| --- | --- | --- | --- |
| Copolymer % w | 50-90 | 70-90 | 75-85 |
| HDPE % w | 3-45 | 3-25 | 5-20 |
| LLDPE % w | 3-45 | 3-25 | 5-20 |

It will be understood that the proportions of components as well as the properties of the blended components may be selected to provide the best balance of properties and cost for any particular intended use. In some cases a lower performance level may be relatively satisfactory and may be commercially preferred if it can be achieved at a lower cost. Generally, the cost of LLDPE and HDPE is lower than that of sequentially polymerized propylene-ethylene copolymer.

Another important aspect of the present invention is the weight ratios of HDPE to LLDPE. The weight ratio should be between 80:20 and 20:80, and the best ratio is at about 30% HDPE-70% LLDPE. This weight ratio is important because it relates to notched Izod toughness.

A critical aspect of the present invention is the visbreaking or peroxide reacting of the components in an extruder. Peroxide-reacting or peroxide-contacting refers to the process of contacting the polymer blend or individual components (impact propylene-ethylene sequential copolymer, HDPE and LLDPE) in an extruder in the presence of a small but effective amount of a free-radical initiator (i.e., a peroxide). Standard techniques for the peroxide cracking of polymers in an extruder are well known and include the processes disclosed in U.S. Pat. No. 3,144,436 and U.S. Pat. No. 3,887,534. Preferred peroxides are those which have relatively high decomposition temperatures and produce volatile decomposition products, the latter being relatively non-toxic and with minimal residual odor. The peroxide of choice is 2,5-dimethyl-2,5-bis(t-butylperoxy)hexane (PX-1). Other peroxides of interest include those which have half-lives of decomposition of the order of seconds at the reaction temperature (about 230° C.) but which are safely stable at storage and ambient temperatures. Decomposition products should preferably be volatile and relatively non-toxic. Many peroxides fit this category and choice is determined by economic considerations and physical form of the peroxide relative to efficiency of utilization. Many of the peroxides that are compatible with this invention are dialkyl peroxides but are not limited to this class. Specific examples are dicumyl peroxide, di-t-butyl peroxide, t-butyl cumyl peroxide and 2,5,dimethyl-2,5-bis(t-butylperoxy)hexyne-3. The amount of peroxide and the cracking temperature depend upon the melt flows of the starting polymers and the desired melt flow of the final composition. If desired, the peroxide may be added in a masterbatch with mineral oil or other polymer. Typical amounts of peroxide are between about 150 parts by weight per million parts by weight total polymer (ppmw) and about 1000 ppmw, preferably between about 400 ppmw and about 700 ppmw. Typical cracking temperatures are between about 190° C. and about 260° C., preferably between about 220° C. and about 240° C.

The order in which the components are mixed and contacted with the peroxide are important considerations in achieving the desired properties. As mentioned earlier, the best property balances are obtained when the propylene copolymer is visbroken separately, and the HDPE and LLDPE are then melt blended with the visbroken propylene copolymer. Depending on the peroxide used, its addition point, and the melt compounding temperatures, the desired separation of processes might be achieved in one melt compounding machine, having for example two feed and melt compounding sections. Good properties may also be obtained by pre-dispersion of the polyethylenes in a first melt compounding step followed by a second melt compounding step wherein the peroxide treatment takes place. It is again understood that this sequence of melt compounding steps could be effected in one suitably equipped melt compounding machine.

The peroxide can also be included in a melt compounding step in which the HDPE and LLDPE are pre-mixed to form a masterbatch. Crosslinking, rather than visbreaking, is then the major chemical transformation. Notched Izod impact of the product of melt compounding the masterbatch with the propylene copolymer is improved relative to compositions wherein the masterbatch is not crosslinked.

The compositions of this invention may of course contain stabilizers and additives conventionally employed in similar polyolefin compositions, such as antioxidants, stabilizers against actinic radiation, antistatic additives, crystallinity nucleating agents, pigments and mineral fillers.

There are also advantages in certain cases in adding a nucleating agent, nucleation being a process well known in the art. See, e.g., U.S. Pat. No. 3,207,739 and 3,268,499, which are herein incorporated by reference. Acceptable nucleating agents include metal benzoates and alkyl substituted metal benzoates. Specific nucleating agents include sodium benzoate, aluminum benzoate, lithium benzoate, and magnesium benzoate, with sodium benzoate being most preferred. The amount of nucleating agent employed where desired is between about 0.1 and 5.0 percent by weight of the total composition, preferably between 0.3 and 2.0 percent by weight.

The compositions of the invention are suitable for the same uses as the commercially used impact-improved polypropylenes, e.g., for automobile trim parts, battery containers, tote boxes, crates, bottles, appliance parts and the like.

Several different propylene-ethylene sequential copolymer base stocks and LLDPEs were employed in the examples. The five base stocks are described below in Table 1. Six different LLDPEs were employed in the examples; as defined in Table 2 below:

TABLE 1

| PP # | Copolymer Fraction, % | Ethylene Content of Copolymer Fraction, % w | Melt Flow, dg/min ASTM D-1238 Cond. L |
|---|---|---|---|
| PP-1 | 13 | 53 | 4.9 |
| PP-2 | 14 | 51 | 3.5 |
| PP-3 | ca 14 | ca 50 | 4.5 |
| PP-4 | 15 | 51 | 4.2 |

TABLE 2

| PE # | Melt Index (ASTM D-1238 Cond. E), dg/min | Co-monomer type | Density g/cc | Source |
|---|---|---|---|---|
| PE-1 | 1 | butene-1 | 0.918 | A |
| PE-2 | 1 | octene-1 | 0.920 | B |
| PE-3 | 5 | butene-1 | 0.934 | C |

A = Exxon
B = Dow
C = Union Carbide

COMPARATIVE EXAMPLE 1

The LLDPE grades compared in this example were PE-1 and PE-2.

Dry blends of 20%w of each LLDPE in PP-1 and PP-2 (not visbroken) medium impact propylene-ethylene sequential copolymers were prepared in accordance with compositions given in Table 3. For visbreaking experiments, PX-1 dialkyl peroxide was added as a concentrate (4.6%w of the commercial peroxide additive—latter 51% active—was diluted with LDPE) at levels of 0.5, 1, and 3%w concentrate basis total blend. It took nearly three times as much peroxide concentrate to crack the LLDPE—propylene copolymer blends to ca 16–18 dg/min as it did PP-1; hence, it can be concluded that a significant degree of LLDPE crosslinking takes place in the visbreaking process. All extrusions for blend preparation of simultaneous cracking were conducted on a 1-inch Killion extruder, and injection molding of ASTM specimens and impact disks was carried out on an Arburg (Model 221/55/250) machine. Physical property measurements are shown in Table 3.

Materials 5–7 show that good impact strength is retained on visbreaking the composition with PE-1 (butene-1 co-monomer) to ca 18 dg/min. Materials 8 and 9 show that PE-2 (octene-1 co-monomer) is a less effective impact modifier for visbroken compositions.

TABLE 3

| Material No. | LLDPE Grade | % w | Base Copolymer | Blend Melt Flow dg/min | Flexural Modulus Tangent 0.05 in/min MPa | Flexural Modulus 1% Secant 0.05 in/min MPa | Gardner Impact −30° C. J (in-lb) | Peroxide Masterbatch, % w |
|---|---|---|---|---|---|---|---|---|
| 1 | — | — | PP-1 | 4.9 | 1100 | 1055 | 1.8 (16.3) | 0 |
| 2 | — | — | PP-1[a] | 5.2 | 1075 | 1010 | 1.8 (16.2) | 0 |
| 3 | — | — | PP-1 | 16.1 | 967 | 956 | 3.1 (21.7) | 1 |
| 4 | — | — | PP-1 | 39.9 | 991 | 961 | 1.9 (17.0) | 3 |
| 5 | PE-1 | 20 | PP-1 | 6.7 | 899 | 874 | 30.1 (266) | 0.5 |
| 6 | PE-1 | 20 | PP-1 | 8.4 | 915 | 877 | 27.0 (239) | 1 |
| 7 | PE-1 | 20 | PP-1 | 17.8 | 816 | 790 | 12.8 (113) | 3 |
| 8 | PE-2 | 20 | PP-1 | 8.2 | 868 | 848 | 25.4 (225) | 1 |
| 9 | PE-2 | 20 | PP-1 | 17.9 | 815 | 788 | 3.6 (31.9) | 3 |
| 10 | PE-1 | 20 | PP-2 | 3.4 | 981 | 951 | 29.4 (260) | 0 |
| 11 | PE-2 | 20 | PP-2 | 4.0 | 999 | 957 | 27.9 (247) | 0 |

[a]Material No. 2 is a re-extrusion of Material No. 1.

COMPARATIVE EXAMPLE 2

In another set of experiments, a series of six letdowns of 4, 8, 12, 16, 20, and 24%w PE-3 LLDPE in PP-3 medium impact copolymer polypropylene, chemically cracked to ~22 dg/min melt flow were prepared on a 2½" Welex extruder. An unmodified sample of PP-3 chemically cracked to ~22 dg/min was also prepared. Injection molded ASTM specimens and impact disks were made from the samples, and physical properties were measured. Results are shown in Table 4. The data indicate that the impact strength of the product samples generally increases with the higher loadings of LLDPE. The stiffness of the samples, however, decreases especially at the higher LLDPE levels. Weld line strength appears to be satisfactory up to a LLDPE level of 16%w.

In comparison to the other examples the visbroken base copolymer Gardner impact result (ca-30° C.) is a factor of 3 or more greater (material 15); hence, the visbroken LLDPE blend compositions gave correspondingly high Gardner toughness values.

then let-down at 15 or 20%w in the PP-4 base copolymer. Table 5 includes results of testing these formulations, including those for which peroxide was added in either masterbatching (Nos. 3, 4) or in final product cracking (Nos. 5, 6).

As is evident from Table 5, the best notched impact (Izod at 23° C.) data are associated with materials for which the pre-extruded mixed polyethylene modifier was used at 20%w and the modifier composition was 70%w LLDPE and 30%w HDPE. For lower flow products (Nos. 2, 4) the Izod results were truly extraordinary in that all exhibited non-break values (previously unheard of for polypropylene of modulus over 830 MPa≃120,000 psi). With peroxide treatment in the masterbatching stage, non-breaks (three out of five specimens) were even seen at the 15%w modifier level (No. 3), but modifier crosslinking appears detrimental to Gardner toughness at 20%w modification (compare No. 4 to 2). Peroxide cracking of Nos. 1 and 2 to give respectively 5 and 6 probably entailed some crosslinking as well; the modulus was reduced, but Izod retention was surprisingly good. Base copolymer properties

TABLE 4

| Properties/Samples | #15 | #16 | #17 | #18 | #19 | #20 | #21 |
| --- | --- | --- | --- | --- | --- | --- | --- |
| Weight percent PE-3 | 0 | 4 | 8 | 12 | 16 | 20 | 24 |
| Melt Flow; dg/min | 22.0 | 22.1 | 25.8 | 24.8 | 23.3 | 21.5 | 19.7 |
| Tensile Yield Strength @ 0.2 MPa: in/min; psi | 24.9 / 3610 | 23.9 / 3470 | 21.9 / 3180 | 21.2 / 3070 | 20.8 / 3020 | 21.0 / 3050 | 19.8 / 2870 |
| 1% Secant Modulus MPa: @ 0.2 in/min; psi | 1250 / 181,000 | 1140 / 165,000 | 1050 / 152,000 | 1020 / 148,000 | 986 / 143,000 | 965 / 140,000 | 841 / 122,000 |
| Tensile Yield Strength @ 2.0 MPa: in/min; psi | 27.0 / 3910 | 25.9 / 3760 | 25.1 / 3640 | 24.3 / 3530 | 23.9 / 3460 | 23.6 / 3430 | 22.7 / 3290 |
| Yield Elongation @ 2.0 in/min; % | 7.3 | 7.3 | 7.7 | 8.4 | 8.6 | 8.6 | 9.7 |
| 1% Secant Flexural Modulus @ 0.05 MPa: in/min; psi | 1010 / 147,000 | 993 / 144,000 | 903 / 131,000 | 883 / 128,000 | 841 / 122,000 | 807 / 117,000 | 807 / 117,000 |
| Heat Deflection Temp. @ 66 psi; °F. | 195 | 175 | 185 | 187 | 177 | 163 | 182 |
| Unnotched Izod Impact Strength @ −18° C.; ft-lb/in | 16.7 | 20.1 | 19.3 | 20.7 | 23.0 | 26.9 | 25.9 |
| Gardner Impact Strength | | | | | | | |
| @ −18° C.; in-lb | 108 | 170 | 199 | 177 | 190 | 209 | 272 |
| @ −29° C.; in-lb | 56 | 93 | 104 | 158 | 170 | 177 | 192 |
| DIF @ −29° C.; ft-lb/in | 67 | 142 | 118 | 148 | 225 | 206 | 235 |
| Hardness, Rockwell "R" | 89 | 85 | 80 | 78 | 76 | 72 | 69 |
| Weld Line Strength[a], % | 8.9 | 7.7 | 6.7 | 5.5 | 5.0 | 4.5 | 3.9 |

[a]Tensile elongation to break on double-gated tensile specimens tested at 5 in/min rate of strain.

Illustrative Embodiment #1

Illustrative Embodiment #1 shows the remarkable notched toughness obtained with compositions according to the present invention.

The polyethylene modifiers for this embodiment were prepared by extruding dry mixtures of appropriate compositions on a 1-inch Killion extruder (500° F.; ca. 1800 psi back pressure). These pelletized modifiers were can affect the overall property envelope, with copolymer rubber content ($F_c$) and melt flow being most critical. Property improvements are seen with increasing $F_c$ and decreasing melt flow. In the present instance, the base copolymer used (PP-4) had an $F_c$ of 15%w and a melt flow of 4.2 dg/min. In addition, polyethylene selection also appears important, and lower melt index polyethylenes such as those used in this work are considered best based on available data.

TABLE 5
PRODUCT DATA

| NO. | PRODUCT MODIFIER COMPOSITION[a] HDPE[b] % w | LLDPE[c] % w | Perox. Conc.[d] % w | MODIFIER CONTENT[e] % w | PRODUCT MELT FLOW dg/min | FLEX. MOD. 0.05 in/min MPa Tan. | 1% Sec. | IZOD IMPACT (NOTCHED)[f] 23° C. J/m | 0° C. J/m | −18° C. J/m | GARDNER IMPACT (125 mil DISK) −30° C. J (in-lb) |
|---|---|---|---|---|---|---|---|---|---|---|---|
| 1 | 30.0 | 70.0 | — | 15 | 3.1 | 1080 | 1030 | 250 (¼ PB) | 51 | 37 | 22.6 (200) |
| 2 | 30.0 | 70.0 | — | 20 | 2.8 | 1070 | 1000 | 5NB | 58 | 39 | 27.1 (240) |
| 3 | 29.7 | 69.3 | 1 | 15 | 2.7 | 1060 | 1010 | 170 (2H; 3NB) | 57 | 37 | 20.0 (177) |
| 4 | 29.7 | 69.3 | 1 | 20 | 2.4 | 1010 | 974 | 5NB | 67 | 43 | 21.1 (186) |
| 5 | Composition No. 1 - Cracked[g] | | | 15 | 10.8 | 867 | 843 | 204 | 68 | 38 | 16.0 (142) |
| 6 | Composition No. 2 - Cracked[g] | | | 20 | 8.1 | 892 | 856 | 560 (5PB) | 85 | 43 | 21.7 (192) |

[a]Modifiers containing both HDPE and LLDPE possibly with peroxide concentrate were pre-extruded on a 1-inch Killion extruder (500° F.; 1800 psi back pressure). Percent of each polyethylene in the modifier is shown.
[b]Allied HDPE (density = 0.960 g/cc and melt index = 0.3 dg/min).
[c]PE-2.
[d]LDPE-based peroxide concentrate (4.6% w active peroxide). The concentrate was added 1% w basis the polyethylene portion of the product for Nos. 3 and 4.
[e]Modifier level in final product.
[f]Notched Izod impact strengths were measured in accordance with ASTM D256, with the convention that letter symbols stand for: H = hinge break, PB = partial break, NB = non-break. Numbers in front of symbols stand for the number of breaks of the indicated type, i.e., the number of specimens that broke in the manner given.
[g]The indicated hybrid products (Nos. 1 and 2) were extruded again under standard conditions in the presence of 2% w of peroxide concentrate.

Illustrative Embodiment #2

Illustrative Embodiment #2 shows the advantages of visbreaking the propylene copolymer separately, and then blending the visbroken propylene copolymer with the HDPE and LLDPE. All compositions to be discussed in this example contained PP-4 as base copolymer. For two-step compounding, the modifiers were pre-extruded, and were then let-down at a prescribed level (e.g. 20%w) in the precracked base copolymer with a 1-inch Killion extruder. Co-cracking generally involved dry mixing all the blend components, including peroxide, and then extruder cracking the mixture under conditions similar to those used for final product formation in the two-step procedure (ca 450° F.; ca 100 rpm; ca 400–500 psi back pressure). In another variant of two-step compounding, the product hybrid containing high density and linear low density polyethylene was itself cracked in a second melt compounding step using similar extrusion conditions. Although melt flow and tensile elongation to break values were then not as good as the preferred two-step approach described above, wherein the propylene copolymer was first visbroken before modifier blending, properties developed remained superior to those of the co-cracking approach.

TABLE 6
PRODUCT DATA

| NO. | PRODUCT MODIFIER COMPOSITION HDPE % w | LLDPE % w | MIXING EQUIP. | PRODUCT MODIFIER CONTENT % w | PRODUCT PEROX. SOURCE | CRACKING ROUTE[a] (STEPS w/BLEND) | BASE COPOLYMER DESIGNATION | MELT FLOW dg/min | PRODUCT MELT FLOW dg/min | Flex. Mod. (0.05 in/min) MPa Tan | 1% Sec. |
|---|---|---|---|---|---|---|---|---|---|---|---|
| 1 | 30[c] | 70[d] | Ext.[e] | 20 | LDPE Conc.[f] | 2 | PP-5-Crk | 18.2 | 10.8 | 900 | 857 |
| 2 | 30[c] | 70[d] | N.A.[g] | 20 | LDPE Conc. | 1 | PP-5 | 4.8 | 8.1 | 980 | 922 |
| 3[h] | 30[c] | 70[d] | Ext. | 20 | LDPE Conc. | 2[i] | PP-5 | 4.8 | 8.1 | 892 | 856 |
| 4 | | 100[j] | — | 14 | Oil Conc.[k] | 1 | PP-5 | 4.8 | 16.8 | 923 | 892 |
| 5 | | 100[j] | — | 14 | Oil Conc. | 1 | PP-5 | 4.8 | 30.7 | 923 | 880 |
| 6 | | 100[j] | — | 20 | LDPE Conc. | 2 | PP-5-Crk | 18.2 | 11.7 | 769 | 743 |

| NO. | PRODUCT MODIFIER COMPOSITION HDPE % w | LLDPE % w | MIXING EQUIP. | TENSILE PROPERTIES (2 in/min.) Yld. Str. MPa | Yld. El. % | Brk. Str. MPa | Brk. El. % | IZOD IMPACT (Notched)[b] 23° C. J/m | 0° C. J/m | Gardner Impact (125 mil Disk) −30° C., J (in-lb) |
|---|---|---|---|---|---|---|---|---|---|---|
| 1 | 30[c] | 70[d] | Ext.[e] | 22.3 | 10.1 | — | 70 | 440 (1H; 4PB) | 68 | 15.8 (140) |
| 2 | 30[c] | 70[d] | N.A.[g] | 22.9 | 8.4 | 15.0 | 20 | 150 (2/5 H) | 62 | 7.5 (66.5) |
| 3[h] | 30[c] | 70[d] | Ext. | 23.5 | 8.6 | — | 25 | 560 (5PB) | 85 | 21.7 (192) |
| 4 | | 100[j] | — | 23.9 | 8.5 | 16.2 | 58 | 66 | 43 | 4.5 (39.5) |
| 5 | | 100[j] | — | 23.3 | 8.1 | 16.8 | 18 | 64 | 33 | 5.4 (48.1) |

TABLE 6-continued
PRODUCT DATA

| | | | | | | | | | | |
|---|---|---|---|---|---|---|---|---|---|---|
| 6 | 100[j] | — | 20.8 | 10.4 | — | ≧330 | 130 | 51 | 26.9 | (238) |

[a]The co-cracking route is denoted "1" (for one-step), and the copolymer precrack followed by modifier blending is denoted "2" (for two-step).
[b]Notched Izod impact strengths were measured in accordance with ASTM D256, with the convention that letter symbols stand for: H = hinge break and PB = partial break.
[c]Allied HDPE (density = 0.960 and melt index = 0.3 dg/min).
[d]PE-2.
[e]Modifier was pre-extruded on 1-inch Killion before extrusion blending with the base copolymer.
[f]4.6% w active peroxide.
[g]N.A. = Not Applicable (The hybrid components were dry-blended and then co-cracked with peroxide during extrusion).
[h]These data (less the tensile properties) are given as No. 6 in Table 5.
[i]The melt compounded product of the given composition was visbroken in a second extrusion step.
[j]PE-3.
[k]20% w active peroxide.
[l]PE-1.

Table 6 contains all formulation information as well as the results of testing. All mechanical properties were obtained on injection molded specimens. For the key comparisons (Nos. 1–3) between one-step and two-step compounding, compositionally identical formulations were used, including the amount of dialkyl peroxide concentrate (2%w basis the final product).

As shown in Table 6:

1. Within the range of materials studied, high impact products (Gardner > 15J) cannot be made at melt flows greater than 10 dg/min via the one-step co-cracking route.

2. Within compositionally identical pairs, two-step compounding by modifier blending after base copolymer cracking led to higher melt flow and produced higher values for Izods, Gardner impacts and elongations to break. With the exceptions of melt flow and tensile elongation to break, two-step compounding wherein the previously melt mixed product composition is then visbroken also leads to the aforementioned property enhancements.

3. Within the extent of compositions covered, co-cracking is not a route to improved notched Izod impact strength as claimed in U.S. Pat. No. 4,375,531. Indeed, the opposite appears to be true for mixed polyethylene modification where it was found that a non-break Izod was produced without peroxide addition (Table 5, No. 2) which became only 150 J/m on co-cracking (No. 2) and became 440 and 560 J/m with the two-step compounding approaches (No. 1 and 3).

What is claimed is:

1. A composition having a melt flow between about 5 and about 50 dg/min (ASTM D1238—Condition L), and a high notched impact value, said composition being obtained by first peroxide-contacting an impact-improved propylene-ethylene copolymer and then melt mixing the resulting visbroken propylene polymer with a linear low density ethylene copolymer and a high density ethylene homopolymer, wherein (a) said impact-improved propylene-ethylene polymer has a melt flow (ASTM D1238-Condition L) of about 0.5–15 dg/min and an elastomeric propylene-ethylene copolymer content of 5–50% by weight, the copolymer fraction having an ethylene content of 30–95% by weight, which propylene-ethylene polymer is the product of sequential polymerization of propylene and a propylene-ethylene mixture over a titanium halide-containing coordination catalyst;

(b) said high density ethylene homopolymer has a density in the range from 0.941 to 0.965 grams per cubic centimeter and a melt index (ASTM D1238-Condition E) in the range from 0 to 20 dg/min;

(c) said linear low density ethylene copolymer is the product of random polymerization of ethylene with up to 15 mole percent of at least one $C_3$–$C_8$ alpha olefin monomer over a transition metal-based coordination catalyst and which has a density below 0.935 and a melt index (ASTM D1238-Condition E) not exceeding 16; and (d) said composition comprises 50–90% by weight of said impact-modified propylene polymer, 3–45% by weight of said high density ethylene homopolymer, 3–45% by weight of said linear low density ethylene copolymer, wherein the weight ratio of said high density ethylene homopolymer to said linear low density ethylene copolymer is between 80:20 and 20:80.

2. The composition according to claim 1 wherein said linear low density ethylene copolymer is an ethylene-1-butene copolymer.

3. The composition according to claim 1 wherein said sequential propylene-ethylene copolymer has a melt flow (ASTM D 1238 Cond. L) between about 4 and 12 dg/min.

4. The composition according to claim 1 wherein said linear low density ethylene copolymer has a melt index (ASTM D1238 Cond. E) between about 1 and 7 dg/min.

5. The composition according to claim 1 wherein said linear low density ethylene copolymer has a density between about 0.917 and 0.925 g/cc.

6. The composition according to claim 1 wherein a nucleating agent is added prior or after visbreaking to improve stiffness and ease of melt processing.

7. The composition according to claim 1 wherein the peroxide-contacting is accomplished by extruding said propylene polymer in the presence of a peroxide.

8. The composition according to claim 7 wherein the amount of peroxide employed is between about 150 and 1500 parts by weight per million parts by weight propylene polymer.

9. The composition according to claim 7 wherein said peroxide is 2,5-dimethyl-2,5-bis(t-butylperoxy)hexane.

10. The composition according to claim 7 wherein said peroxide-contacting takes place at a temperature between about 190° C. and 260° C.

11. The composition according to claim 1 wherein said high density polyethylene has a density between about 0.955 and 0.965.

12. The composition according to claim 1 wherein said high density polyethylene has a density between about 0.955 and 0.965.

13. A composition having a melt flow between about 5 and about 50 dg/min (ASTM D1238-Condition L), and a high notched impact value, said composition being obtained by first melt blending an impact-improved propylene-ethylene copolymer with a linear low density ethylene copolymer and a high density ethylene homopolymer, and then contacting said blend containing well dispersed polyethylene modifiers with a peroxide during further melt mixing, wherein:

(a) said impact-improved propylene-ethylene polymer has a melt flow (ASTM D1238-Condition L) of about 0.5–15 dg/min and an elastomeric propylene-ethylene copolymer content of 5–50% by weight, the copolymer fraction having an ethylene content of 30–95% by weight, which propylene-ethylene polymer is the product of sequential polymerization of propylene and a propylene-ethylene mixture over a titanium halide-containing coordination catalyst;

(b) said high density ethylene homopolymer has a density in the range from 0.941 to 0.965 grams per cubic centimeter and a melt index (ASTM D1238-Condition E) in the range from 0 to 20 dg/min;

(c) said linear low density ethylene copolymer is the product of random polymerization of ethylene with up to 15 mole percent of at least one $C_3$–$C_8$ alpha olefin monomer over a transition metal-based coordination catalyst and which has a density below 0.935 and a melt index (ASTM D1238-Condition E) not exceeding 16; and (d) said composition comprises 50–90% by weight of said impact-modified propylene polymer, 3–45% by weight of said high density ethylene homopolymer, 3–45% by weight of said linear low density ethylene copolymer, wherein the weight ratio of said high density ethylene homopolymer to said linear low density ethylene copolymer is between 80:20 and 20:80.

14. The composition according to claim 13 wherein said linear low density ethylene copolymer is an ethylene-1-butene copolymer.

15. The composition according to claim 13 wherein said sequential propylene-ethylene copolymer has a melt flow (ASTM D 1238 Cond.L) between about 4 and 12 dg/min.

16. The composition according to claim 13 wherein said linear low density ethylene copolymer has a melt index (ASTM D1238 Cond. E) between about 1 and 7 dg/min.

17. The composition according to claim 13 wherein said linear low density ethylene copolymer has a density between about 0.917 and 0.925 g/cc.

18. The composition according to claim 13 wherein a nucleating agent is added prior or after visbreaking to improve stiffness and ease of melt processing.

19. The composition according to claim 13 wherein the peroxide-contacting is accomplished by extruding said propylene polymer melt blend with polyethylenes in the presence of a peroxide.

20. The composition according to claim 19 wherein the amount of peroxide employed is between about 150 and 1000 parts by weight per million parts by weight propylene polymer blend with polyethylenes.

21. The composition according to claim 19 wherein said peroxide is 2,5-dimethyl-2,5-bis(t-butylperoxy)hexane.

22. The composition according to claim 19 wherein said peroxide-contacting takes place at a temperature between about 190° C. and 260° C.

23. The composition according to claim 13 wherein said high density polyethylene has a density between about 0.955 and 0.965.

24. The composition according to claim 13 wherein the peroxide is sufficiently thermally stable such that it can be added with the other components of the composition, and does not decompose to initiate visbreaking until the polyethylene modifiers are well dispersed during melt mixing.

25. The composition according to claim 24 wherein the peroxide has a one-hour half life for decomposition at a temperature greater than 148° C.

26. The composition according to claim 24 wherein the peroxide is 2,5-dimethyl-2,5-bis(t-butylperoxy)hexyne-3.

27. The composition according to claim 1 wherein said linear low density ethylene copolymer has a density in the range from 0.912 to 0.935 g/cc.

28. The composition according to claim 13 wherein said linear low density ethylene copolymer has a density in the range from 0.912 to 0.935 g/cc.

* * * * *